United States Patent [19]
Cecchi et al.

[11] Patent Number: 4,628,713
[45] Date of Patent: Dec. 16, 1986

[54] LOCK FOR VIDEO TAPE CASSETTES
[75] Inventors: Marino Cecchi, Lincolnshire; Gregory J. Borucki, Hinsdale, both of Ill.
[73] Assignee: Tape-Lock Company, Oak Brook, Ill.
[21] Appl. No.: 717,815
[22] Filed: Mar. 29, 1985
[51] Int. Cl.⁴ ............................................. E05B 73/00
[52] U.S. Cl. ............................................. 70/58; 70/371; 70/387; 360/132; 360/137
[58] Field of Search ...................... 70/57, 58, 370, 371, 70/387; 360/60, 132, 85, 92; 292/318, 321, 307 R, 336.3, DIG. 31; 340/568, 571

[56] References Cited
U.S. PATENT DOCUMENTS

| | | | |
|---|---|---|---|
| 972,853 | 10/1910 | Hambry et al. | 70/371 |
| 2,291,217 | 7/1942 | Hoecker | 70/371 |
| 2,506,846 | 5/1950 | Teasdale | 70/58 |
| 3,940,799 | 2/1976 | Matsumoto | 360/60 |
| 3,955,842 | 5/1976 | Edwards | 292/307 R |
| 4,044,386 | 8/1977 | Satou | 360/132 |
| 4,112,990 | 9/1978 | Anderson | 292/307 R |
| 4,325,237 | 4/1982 | Menzie | 70/371 |
| 4,348,700 | 9/1982 | Iovino | 360/60 |
| 4,462,056 | 7/1984 | Kara | 360/85 |
| 4,507,692 | 3/1985 | Sasaki | 360/60 |
| 4,550,580 | 11/1985 | Neyret | 70/370 |
| 4,562,709 | 1/1986 | Canadas et al. | 70/380 |
| 4,563,673 | 1/1986 | Fechner | 340/568 |

FOREIGN PATENT DOCUMENTS
8302846 8/1983 Int'l Pat. Institute .

Primary Examiner—Gary L. Smith
Assistant Examiner—Suzanne L. Dino
Attorney, Agent, or Firm—Gary, Juettner & Pyle

[57] ABSTRACT

A lock for a VHS video cassette is characterized by an insert extendible into and latchable within a sensor LED transmission receptacle of a housing for the cassette. The insert cannot be removed from the receptacle without a special key, and while in the receptacle presents a physical obstruction to the cassette being inserted into a video cassette recorder. The lock thus provides a convenient means to prevent unauthorized playing of a video cassette.

13 Claims, 7 Drawing Figures

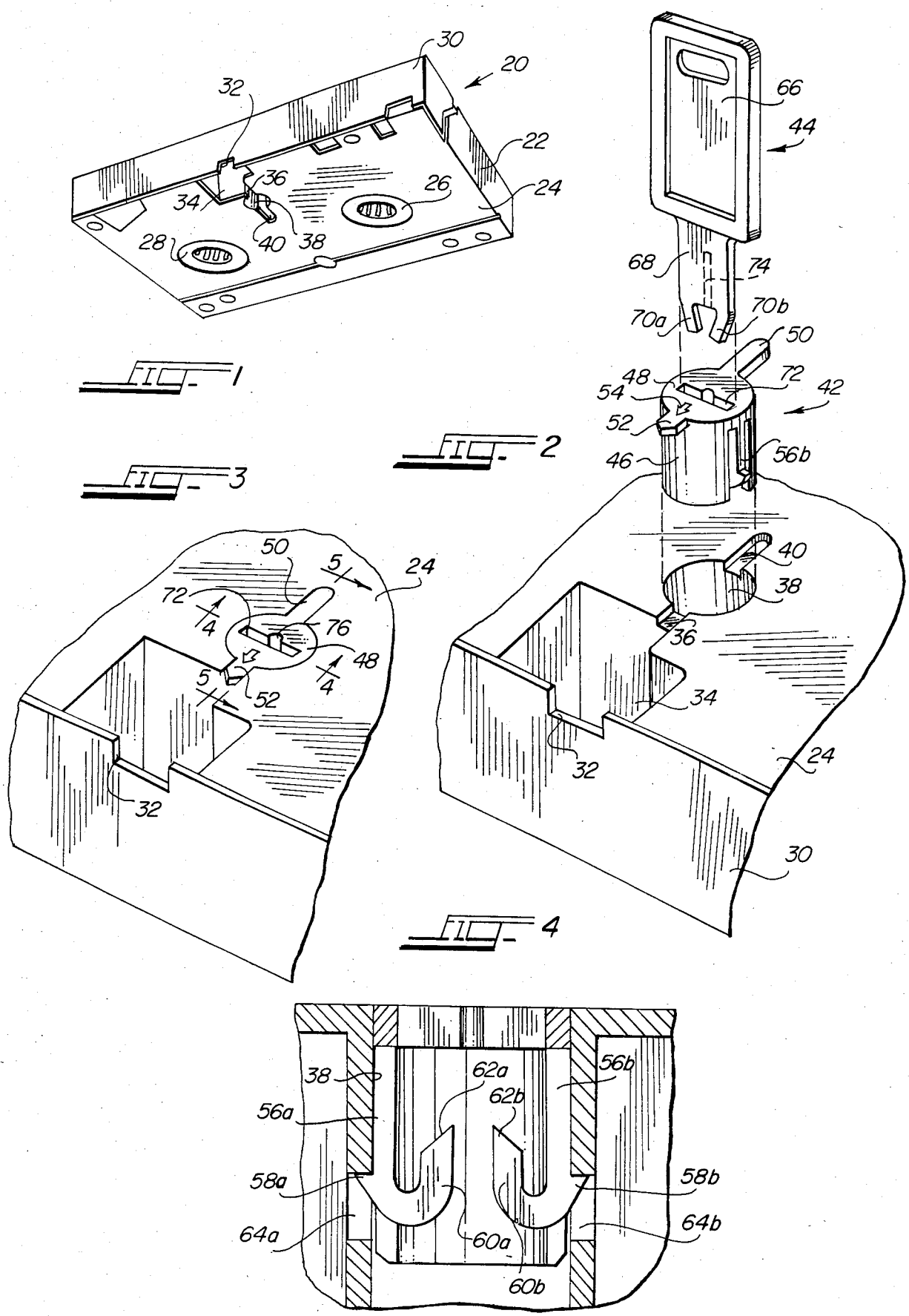

LOCK FOR VIDEO TAPE CASSETTES

BACKGROUND OF THE INVENTION

The present invention relates to a lock which is connectable with a housing of a video tape cassette to prevent insertion of the cassette into a video cassette recorder and thereby preclude playing of the cassette.

Video tape cassettes have gained wide acceptance as a means for recording and storing various types of information, such as business, financial, instructional and the like, much of which is often proprietary. Such cassettes may also have recorded thereon movies or other matter unsuitable for viewers of all ages. In consequence, it has been recognized for some time that some material recorded on video cassettes should be protected against unauthorized viewing. However, the only means heretofore available to prevent unauthorized viewing has been to lock the cassettes away in a secure place, but a lockable facility is not always readily available.

OBJECT OF THE INVENTION

The primary object of the present invention is to provide an economical and convenient lock for video tape cassettes to prevent unauthorized playing of the cassette.

SUMMARY OF THE INVENTION

In accordance with the present invention, there is provided apparatus for preventing playing of a VHS video tape cassette having a path defined along a lower housing surface from a slot in a door to and through a sensor LED transmission receptacle into a channel beyond the receptacle to accommodate travel of a cassette orienting pin on a tape deck of a VHS video cassette recorded (VCR) upon placement of the cassette into the VCR in proper orientation. Said apparatus comprises a lock attachable to the cassette housing to block the path against travel of the VCR orienting pin therealong, thereby to prevent the cassette from being inserted into the VCR, and a key for said lock to detach the same from the cassette. Preferably, the lock is extendible into and attachable to the cassette housing within the sensor LED transmission receptacle to block the path at the receptacle.

The foregoing and other objects, advantages and features of the invention will become apparent upon a consideration of the following detailed description, when taken in conjunction with the accompanying drawings.

BRIEF DESCRIPTION OF THE DRAWINGS

FIG. 1 is a perspective view of a VHS video tape cassette, particularly showing a lower surface and door of a housing of the cassette;

FIG. 2 is a perspective view of a lock for the cassette and a key for the lock in accordance with the teachings of the invention, illustrating the manner in which the lock may be inserted into the cassette housing to prevent unauthorized playing of recorded material;

FIG. 3 is a perspective view of the lock fully inserted into and connected with the cassette;

FIG. 4 is a cross sectional side elevation view taken substantially along the lines 4—4 of FIG. 3, illustrating structural details of the lock and the manner in which it attaches to the cassette housing;

DETAILED DESCRIPTION

Figure 5:
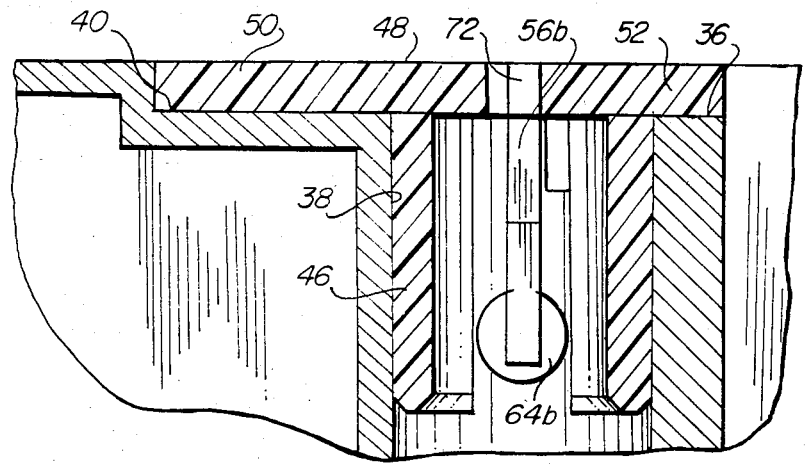
FIG. 5 is a cross sectional side elevation view taken substantially along the lines 5—5 of FIG. 3.

There is shown in FIG. 1 a conventional VHS video tape cassette with which the lock of the invention may advantageously be used. The cassette is indicated generally at 20, and includes an outer housing 22 having a bottom wall 24 and tape reels 26 and 28 partially exposed through openings in the bottom wall. A door 30 pivotally mounts on the housing, and when the cassette is not in use the door is locked in a closed position as shown. Upon placement of the cassette into a video cassette recorded (VCR), a door release latch (not shown) is tripped to free the door to be opened and expose the video tape to magnetic heads of the VCR.

As is known, the video tape cassette is structurally configured in a manner to permit it to be inserted into a VCR only in proper orientation, and to that end, and with reference also to FIG. 2, a slot 32 is in the lower edge of the door 30. Defined in the housing bottom wall 24 rearwardly of and longitudinally aligned with the slot are an opening 34, a channel 36, a sensor LED transmission receptacle 38 and a channel 40. The proper orientation of the cassette for insertion of the same into a VCR is with the door 30 facing forwardly (toward the VCR tape deck) and the slot 32 downward, and with the cassette so oriented, as it is moved fully into the VCR, an upstanding pin on the VCR tape deck travels through the slot 32, opening 34, channel 36 and sensor LED transmission receptacle 38 into the channel 40. However, should the cassette be improperly oriented, the pin on the tape deck will block the cassette from fully entering the VCR.

With the foregoing in mind, the invention contemplates providing a means for blocking the straight line path between the door slot 32 and channel 40 to prevent the pin on the VCR tape deck from passing to the channel 40 as the cassette is inserted into the VCR, thereby to prevent the cassette from being fully inserted into the VCR and played. To that end, the invention provides a novel lock, indicated generally at 42, which is insertable into and lockable within the sensor LED transmission receptacle 38, and which when inserted blocks the path through the receptacle and the channels 36 and 40. Once inserted, the lock cannot be removed except by use of a special key, indicated generally at 44, whereby only the person possessing the key can remove the lock to permit the cassette to be inserted into a VCR and played.

More particularly and with reference to FIGS. 2-5, the lock 42 is of integral structure and made of a strong yet resilient material, such as a plastics material. The lock includes a generally cylindrical body portion 46 of a diameter permitting snug but free sliding reception of the same within the receptacle 38, along with an upper planar wall 48 having a relatively long extension 50 and a relatively short extension 52 diagonally opposite therefrom for respectively being received in the cassette base wall channels 40 and 36. An arrow 54 is advantageously on the lock surface 48 and points toward the front of the video tape cassette 20 when the lock is properly oriented for insertion into the receptacle.

Extending downwardly (as shown) from the surface 48 within diagonally opposite slots in the cylindrical body 46 of the lock are a pair of flexible arms 56a and 56b, which carry at their lower ends respective outwardly extending tangs 58a and 58b and inwardly extending U-shaped portions 60a and 60b having upper tapered ends 62a and 62b. The tangs are adapted to securely yet releasably latch the lock within the sensor LED transmission receptacle 38, and to that end the receptacle has toward its inner end a pair of diametrically opposed side apertures 64a and 64b. As is known, when the cassette is in a VCR the side apertures accommodate a path for light generated by an LED in the receptacle to photodetectors on opposite sides of the cassette, which photodetectors sense the light at the end of winding or rewinding the tape when a clear portion of the tape passes between the LED and a respective one of the photodetectors, thereby to terminate the winding or rewinding operation.

Accordingly, the structure of the lock 42 is such that as the lock is inserted into the receptacle 38, the arms 56a and 56b are deflected inwardly as outer ends of the tangs 58a and 58b enter and slide along the surface of the receptacle, until the lock is inserted an amount sufficient to seat the extensions 50 and 52 within the respective channels 40 and 36, at which point the tangs 58a and 58b move below upper ends of the side apertures 64a and 64b and into the side apertures to latch the lock in place in the receptacle. When so inserted and latched in place the lock then blocks the straight line path between the door slot 32 and the channel 40, whereby the pin on the tape deck of the VCR will engage the lock and prevent insertion of the cassette into the VCR in playing position.

Once inserted and latched in place within the sensor LED transmission receptacle 38 of the video tape cassette 20, the lock 42 is difficult if not impossible to remove without destroying the lock unless the key 44 is used, since the construction of the lock is such as to inhibit its removal from the cassette even with use of improvised tools. Consequently, the lock will prevent all but the most determined unauthorized playing of the cassette. As is apparent from FIGS. 3-5, when the lock is in place in the cassette, the upper surface 48 of the lock is flush with the cassette bottom wall 24, thereby to allow normal storage of the cassette.

Figure 6:
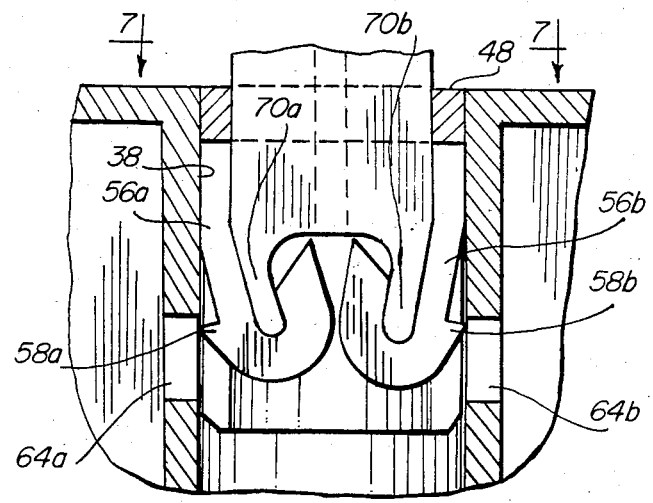
FIG. 6 is similar to FIG. 4, except that the key is shown extended into and unlatching the lock from the cassette housing.
Figure 7:
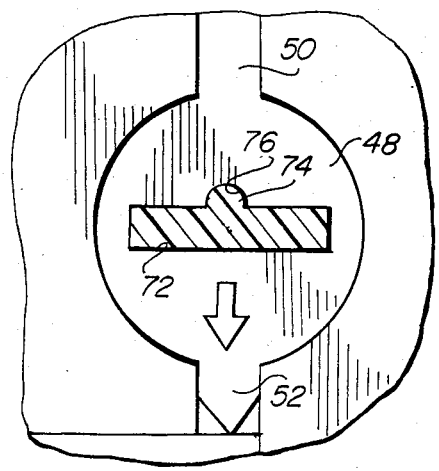
FIG. 7 is a plan view taken along the lines 7—7 of FIG. 6, and shows structures of the key and lock which enable the same to be encoded so that only a selected key can be used with a selected lock.

To accommodate authorized removal of the lock 42, the key 44 is provided. The key has a hand grippable portion 66 and an elongate, relatively wide but narrow extension 68 extending from the grippable portion. The extension is bifurcated at its lower end to define a pair of spaced apart tines 70a and 70b, and the tines and extension are extendable through an elongate slot 72 in the lock surface 48 to the interior of the lock to bring the tines into engagement with the upper tapered ends 62a and 62b of the inwardly extending U-shaped portions 60a and 60b of the arms 56a and 56b. Upon engagement of the tines with the tapered ends, continued movement of the key into the lock cams the arms inwardly until the tines extend into open centers of the U-shaped portions, as shown in FIG. 6, at which point the tangs 58a and 58b have been moved inwardly of the side apertures 64a and 64b of the receptacle 38. Thus, with the key tines gripping the U-shaped portions 60a and 60b, the lock may be pulled out of the receptacle with the key.

To provide added security against unauthorized removal of the lock, the lock and key are encoded in a complementary manner, so that only a selected key will open a particular lock. For the purpose, the key is selectively provided with one or more elongate ribs 74 along one side of its extension 68, and the slot 72 in the lock surface 48 has complementary groove(s) 76 to accommodate the rib(s) as the key is extended into the lock. As is apparent, various combinations of encoding may be realized by varying the number of ribs and grooves as well as by varying their locations. Advantageously, the key 44 is made of metal to inhibit the filing off of the rib(s) to defeat the encoding scheme.

While one embodiment of the invention has been described in detail, various modifications and other embodiments thereof may be derived by one skilled in the art without departing from the spirit and scope of the invention, as defined in the appended claims.

What is claimed is:

1. Apparatus in combination with a (VHS) video tape cassette for preventing playing of said cassette, said cassette having a housing in which an elongate path is defined to accommodate travel of a cassette orienting pin on a tape deck of a video cassette recorder (VCR) upon movement of said cassette into the VCR in proper orientation, said apparatus comprising a lock attachable to said cassette housing to block said path and therefore travel of the VCR orienting pin therealong upon movement of said cassette into the VCR, whereby said lock prevents said cassette from being fully inserted into the VCR, and a key for said lock to detach said lock from said cassette housing to enable said cassette to be fully inserted into the VCR.

2. Apparatus as in claim 1, wherein said lock is configured for attachment to said cassette housing at a point to block said path intermediate opposite ends thereof.

3. Apparatus as in claim 1, wherein said lock is extendible into and attachable to said housing within a recess in said housing to block said path.

4. Apparatus as in claim 3, wherein said lock does not extend beyond the outer end of said housing recess when attached to said housing therein, so that said lock does not extend beyond the outer dimensions of said housing.

5. Apparatus in combination with a (VHS) video tape cassette for preventing playing of said cassette, said cassette having a path defined along a lower surface of a housing thereof from a slot in a door of said cassette, through an opening, a first channel and a sensor LED transmission receptacle to a second channel, said path accommodating travel of a cassette orienting pin on a tape deck of a video cassette recorder (VCR) upon movement of said cassette fully into the VCR in proper orientation, said apparatus comprising a lock attachable to said cassette housing to block said path and to therefore block travel of the VCR orienting pin along said path upon movement of said cassette into the VCR, whereby said lock prevents said cassette from being fully inserted into the VCR, and a key for said lock to detach the same from said cassette housing to enable said cassette to be fully inserted into the VCR.

6. Apparatus as in claim 5, wherein said lock is configured for attachment to said cassette housing at a point intermediate opposite ends of said path.

7. Apparatus as in claim 5, wherein said lock is extendible into and attachable to said cassette housing within said sensor LED transmission receptacle to block said path.

8. Apparatus as in claim 7, wherein said lock has a length such that an outer end of said lock is flush with an outer end of said receptacle when said lock is extended and attached to said cassette housing therein, whereby said lock does not extend beyond and change the outer dimensions of said cassette housing.

9. Apparatus as in claim 7, wherein said lock is generally cylindrical and of a diameter for a snug but free sliding fit within said sensor LED transmission receptacle.

10. Apparatus as in claim 7, wherein an outer end of said lock has extensions for moving into and blocking said first and second channels, whereby said lock blocks said path through said first and second channels and said sensor LED transmission receptacle.

11. Apparatus as in claim 7, wherein said lock includes a pair of tangs on opposite sides thereof for entering side apertures in said housing within said sensor LED transmission receptacle to attach said lock to said housing within said receptacle.

12. Apparatus as in claim 11, wherein said lock includes means for resiliently urging said tangs outwardly of said lock, whereby said tangs are urged into said sensor LED transmission receptacle side apertures to secure said lock in said receptacle, said key being extendible into said lock into coupled engagement with said tangs to move the same out of said side apertures against said resilient urging means to thereby detach said lock from said housing and enable said lock to be removed from said receptacle.

13. Apparatus as in claim 7, wherein said key is extendible into said lock to detach said lock from said housing, and including complementary encoding means on said key and lock to enable only said key to be extended into said lock and to prevent other keys having different encoding means from being extended into said lock.

* * * * *